(12) United States Patent
Dong et al.

(10) Patent No.: US 11,427,735 B2
(45) Date of Patent: Aug. 30, 2022

(54) THERMAL BENDING-FREE PHOTOCURING CURVED SCREEN PROTECTIVE PASTER

(71) Applicant: Dongguan Boyide Science and Technology Industry Co., Ltd., Guangdong (CN)

(72) Inventors: Cundong Dong, Guangdong (CN); Yongxin Qin, Guangdong (CN); Peng Zhao, Guangdong (CN); Kun Chen, Guangdong (CN)

(73) Assignee: Dongguan Boyide Science and Technology Industry Co., Ltd., Dongguan (CN)

( * ) Notice: Subject to any disclaimer, the term of this patent is extended or adjusted under 35 U.S.C. 154(b) by 210 days.

(21) Appl. No.: 16/877,515

(22) Filed: May 19, 2020

(65) Prior Publication Data
US 2021/0115305 A1 Apr. 22, 2021

(30) Foreign Application Priority Data
Oct. 16, 2019 (CN) .......................... 201910985079.0

(51) Int. Cl.
| | |
|---|---|
| *C09J 7/29* | (2018.01) |
| *B32B 7/12* | (2006.01) |
| *B32B 9/04* | (2006.01) |
| *B32B 27/08* | (2006.01) |
| *B32B 27/30* | (2006.01) |
| *B32B 27/36* | (2006.01) |

(52) U.S. Cl.
CPC ....................................... *C09J 7/29* (2018.01); *B32B 7/12* (2013.01); *B32B 9/045* (2013.01); *B32B 27/08* (2013.01); *B32B 27/308* (2013.01); *B32B 27/36* (2013.01); *B32B 2250/24* (2013.01); *B32B 2405/00* (2013.01); *C09J 2301/312* (2020.08); *C09J 2467/006* (2013.01); *C09J 2475/006* (2013.01)

(58) Field of Classification Search
CPC .... B32B 27/308; C08G 18/34; C08G 18/341; C08G 18/343; C08G 18/345; C08G 18/346; C08L 75/14; C08L 75/16
See application file for complete search history.

(56) References Cited

FOREIGN PATENT DOCUMENTS

JP 2018060081 A * 4/2018

OTHER PUBLICATIONS

Machine Translation JP 2018-060081 (Year: 2018).*

* cited by examiner

*Primary Examiner* — Zachary M Davis

(57) ABSTRACT

The disclosure provides a thermal bending-free photocuring curved screen protective paster which comprises a first protective film, an OCA glue layer, a main functional layer, a PET film layer, a surface functional layer and a second protective film sequentially arranged from bottom to top. The protective paster of the disclosure can be well attached to a curved screen and the like, and avoids the phenomena of warping, forming failure, springback and the like occurring after the traditional protective film is attached. The protective paster of the disclosure has good wear resistance, good anti-scraping effect, good transparency, good temperature resistance and stable structure, which can be prepared into a film with any angle, can be firmly attached to a curved screen with a large radian, and can effectively protect the curved screen.

8 Claims, No Drawings

THERMAL BENDING-FREE PHOTOCURING CURVED SCREEN PROTECTIVE PASTER

CROSS-REFERENCE TO RELATED APPLICATION

This application claims the benefit of Chinese patent application No. 201910985079.0 filed on Oct. 16, 2019, the contents of which are incorporated herein by reference in their entirety.

TECHNICAL FIELD

The disclosure relates to the technical field of protective films, in particular to a thermal bending-free photocuring curved screen protective paster.

BACKGROUND ART

With the continuous innovation of smart phone technology, the curved screen has begun to enter people's field of view, and the characteristic of a curved screen is very large bending angle (the curved screen in HUAWEI mobile phone is 88°). However, at present, there are no solid protection measures for curved screens, the screen is easy to break or scratch, and the curvature of the traditional toughened film is difficult to exceed 80%. In addition, the traditional resin protective film is firstly heated and bent into an arc surface and then attached to the mobile phone screen. When a curved screen with an ultra-large bending angle is targeted, the problems of warping, springback, and the like are inevitably caused.

SUMMARY OF THE DISCLOSURE

The disclosure aims to provide a thermal bending-free photocuring curved screen protective paster, which solves the problems that in the prior art, a protective film for a curved screen is poor in attachment and easy to generate warping, springback and the like.

The technical solution adopted by the disclosure for solving the technical problem is as follows: a thermal bending-free photocuring curved screen protective paster, comprising a first protective film, an OCA glue layer, a main functional layer, a PET film layer, a surface functional layer and a second protective film sequentially arranged from bottom to top, wherein the OCA (Optically Clear Adhesive) glue layer refers to a glue layer formed by optical glue, and the PET film layer is a hardened film layer made of PET (polyethylene terephthalate) resin.

In the thermal bending-free photocuring curved screen protective paster according to the present disclosure, the main functional layer comprises a thermosetting acrylic resin, isocyanate, a defoaming agent, a leveling agent and a thickening agent. Among them, the thermosetting acrylic resin is preferably a thermosetting acrylic resin which is dual-cured by heating and UV. The isocyanate is preferably a normal-temperature reactive isocyanate, while the isocyanate is used as a cross-linking agent to react with a hydroxyl group in the acrylic resin to form a cross-linked network. A cyano group in the isocyanate reacts with the hydroxyl group in the thermosetting acrylic resin, but the initiation temperature is not suitably high, otherwise bubbles are easily generated. The reaction is preferably initiated at 50° C.-80° C. The defoaming agent includes, but is not limited to, at least one of silicone emulsions, higher alcohol fatty acid ester complexes, polyoxyethylene polyoxypropylene pentaerythritol ethers, polyoxyethylene polyoxypropanol amine ethers, polyoxypropylene glycerol ethers and polyoxypropylene polyoxyethylene glycerol ethers, and polydimethylsiloxanes. The leveling agent includes, but is not limited to, silicone-type, acrylate-type, fluorine-modified acrylic resin-type, and the like, for example, silicone oil, organo-modified polysiloxane acrylic leveling agents, such as products of 1073, 1074, and the like from MONENG Chemical co. LTD. The thickening agent includes, but is not limited to, at least one of hydroxyethyl cellulose, methylhydroxyethyl cellulose, ethylhydroxyethyl cellulose, methylhydroxypropyl cellulose, and polyurethane.

In the thermal bending-free photocuring curved screen protective paster according to the present disclosure, a mass of the isocyanate accounts for 3-45% of a mass of the thermosetting acrylic resin; a mass of the defoaming agent accounts for 0.01-3% of the mass of the thermosetting acrylic resin; a mass of the leveling agent accounts for 0.05-3.5% of the mass of the thermosetting acrylic resin; and a mass of the thickening agent accounts for 0.4-1.5% of the mass of the thermosetting acrylic resin.

In the thermal bending-free photocuring curved screen protective paster according to the present disclosure, the thermosetting acrylic resin has a hydroxyl value of 20-150 mgKOH/g, preferably 40-90 mgKOH/g, wherein mgKOH/g is an acidity value unit and refers to milligrams of potassium hydroxide (mgKOH/g) required to neutralize free fatty acids in 1 gram of grease. In order to ensure the formation of cross-linked network system of thermosetting resin, a certain active group (i.e. hydroxyl group, the content of which is expressed by hydroxyl value) is needed in acrylic acid. The cross-linking degree is not enough when the hydroxyl value is too low, and the resin toughness is too good to qualitatively protect the paster and inhibit the springback of an arc edge of the protective paster. The cross-linking degree is too high when the hydroxyl value is too high, so that the resin is too brittle and is easy to break when being attached to a curved screen.

In the thermal bending-free photocuring curved screen protective paster according to the present disclosure, a light transmittance of the main functional layer is ≥90%; preferably, the light transmittance of the main functional layer is ≥92%.

In the thermal bending-free photocuring curved screen protective paster according to the present disclosure, the surface functional layer comprises a hardened layer composed of acrylic resin or a surface functional layer composed of polyurethane resin.

In the thermal bending-free photocuring curved screen protective paster according to the present disclosure, a thickness of the main functional layer is 25-250 μm, such as 30 μm, 35 μm, 40 μm, 45 μm, 50 μm, 55 μm, 70 μm, 90 μm, 120 μm, 150 μm, 200 μm, 230 μm, preferably 50-90 μm; a thickness of the OCA glue layer is 5-100 μm, such as 10 μm, 15 μm, 20 μm, 25 μm, 30 μm, 35 μm, 40 μm, 50 μm, 75 μm, preferably 5-75 μm; a thickness of the surface functional layer is 2-10 μm, preferably 2-5 μm; a thickness of the PET film layer is 25-150 μm, preferably 50-75 μm; a thickness of the first protective film is 25-150 μm; and a thickness of the second protective film is 25-150 μm, preferably 50 to 75 μm.

In the thermal bending-free photocuring curved screen protective paster according to the present disclosure, a peel strength of the first protective film is 0.1-1 N/m, preferably 0.3-0.7 N/m; and a peel strength of the second protective film is 0.3-5 N/m, preferably 1-2 N/m.

In the thermal bending-free photocuring curved screen protective paster according to the present disclosure, the first protective film is an acrylic protective film and the second protective film is a silica gel protective film.

In the thermal bending-free photocuring curved screen protective paster according to the present disclosure, a reaction of a cyano group in the isocyanate with a hydroxyl group in the thermosetting acrylic resin is initiated at 50° C.-80° C. The initiation temperature is not suitably too high, and otherwise bubbles are easily generated in the protective paster.

The thermal bending-free photocuring curved screen protective paster of the present disclosure has the following beneficial effects that: the protective paster of the disclosure can be well attached to a curved screen and the like, and avoids the phenomena of warping, forming failure, springback and the like occurring after the traditional protective film is attached. The protective paster of the disclosure has good wear resistance, good anti-scraping effect, good transparency, good temperature resistance and stable structure, which can be prepared into a film with any angle, can be firmly attached to a curved screen with a large radian, and can effectively protect the curved screen.

DETAILED DESCRIPTION OF THE DISCLOSURE

The thermal bending-free photocuring curved screen protective paster of the present disclosure is further described below with reference to embodiments:

Embodiment 1

In the embodiment, the structure of the thermal bending-free photocuring curved screen protective paster sequentially comprises a first protective film, an OCA glue layer, a main functional layer, a PET resin hardened film layer, a surface functional layer and a second protective film from bottom to top. The layers are overlapped according to the structure to obtain the thermal bending-free photocuring curved screen protective paster, and a target product can be prepared through processes of die cutting, laminating, curing and the like. The first protective film is an acrylic protective film, and the second protective film is a silica gel protective film. The thickness of each film is shown in Table 1.

The main functional layer comprises a thermosetting acrylic resin, isocyanate, polyoxyethylene polyoxypropanol amine ether defoaming agent, 1073 leveling agent from MONENG Chemical co. LTD and methyl hydroxyethyl cellulose thickening agent. A mass of the isocyanate accounts for 25% of the mass of the thermosetting acrylic resin; a mass of the defoaming agent accounts for 1% of the mass of the thermosetting acrylic resin; a mass of the leveling agent accounts for 0.8% of the mass of the thermosetting acrylic resin; and a mass of the thickening agent accounts for 1.2% of the mass of the thermosetting acrylic resin. The thermosetting acrylic resin has a hydroxyl value of 60 mgKOH/g. The light transmittance of the main functional layer is ≥92%. The surface functional layer includes a hardened layer composed of acrylic resin. The peel strength of the first protective film is 0.5 N/m; and the peel strength of the second protective film is 1.5 N/m.

TABLE 1

| material layers from bottom to top | thickness/ μm | thickness/ μm | thickness/ μm | thickness/ μm |
| --- | --- | --- | --- | --- |
| first protective film | 50 | 50 | 50 | 50 |
| OCA glue layer | 30 | 10 | 15 | 25 |
| main functional layer | 25 | 60 | 90 | 120 |
| PET resin hardened film layer | 30 | 38 | 50 | 75 |
| surface functional layer | 3 | 3 | 3 | 3 |
| second protective film | 50 | 50 | 50 | 50 |
| springback | no springback | no springback | no springback | no springback |
| firmness of attachment | firm | firm | firm | firm |

Thermal cycle test is performed on the obtained thermal bending-free photocuring curved screen protective paster to observe the springback condition of the arc edge, wherein the thermal cycle test conditions are as follows: −20-90° C., temperature changing rate being 10° C./min, test time being 72 h; and the influence of springback on the firmness of attachment of the protective paster is tested. The results show that the obtained thermal bending-free photocuring curved screen protective pasters are all firmly attached to the curved screen with ultra-large bending angle, have no springback, and have good performance.

Embodiment 2

In the embodiment, the structure of the thermal bending-free photocuring curved screen protective paster sequentially comprises a first protective film, an OCA glue layer, a main functional layer, a PET resin hardened film layer, a surface functional layer and a second protective film from bottom to top. The layers are overlapped according to the structure to obtain the thermal bending-free photocuring curved screen protective paster, and a target product can be prepared through processes of die cutting, laminating, curing and the like. The first protective film is an acrylic protective film, and the second protective film is a silica gel protective film. The thickness of each film is shown in Table 2.

The main functional layer comprises a thermosetting acrylic resin, isocyanate, polyoxypropylene glycerol ether defoaming agent, 1074 leveling agent from MONENG Chemical co. LTD and hydroxyethyl cellulose thickening agent. A mass of the isocyanate accounts for 3% of the mass of the thermosetting acrylic resin; a mass of the defoaming agent accounts for 0.01% of the mass of the thermosetting acrylic resin; a mass of the leveling agent accounts for 0.05% of the mass of the thermosetting acrylic resin; and a mass of the thickening agent accounts for 0.4% of the mass of the thermosetting acrylic resin. The thermosetting acrylic resin has a hydroxyl value of 20 mgKOH/g. The light transmittance of the main functional layer is ≥92%. The surface functional layer includes a surface functional layer composed of polyurethane resin. The peel strength of the first protective film is 0.1 N/m; and the peel strength of the second protective film is 0.3 N/m.

TABLE 2

| material layers from bottom to top | thickness/ μm | thickness/ μm | thickness/ μm | thickness/ μm |
| --- | --- | --- | --- | --- |
| first protective film | 50 | 50 | 50 | 50 |
| OCA glue layer | 30 | 10 | 15 | 25 |
| main functional layer | 25 | 60 | 90 | 120 |

TABLE 2-continued

| material layers from bottom to top | thickness/ μm | thickness/ μm | thickness/ μm | thickness/ μm |
|---|---|---|---|---|
| PET resin hardened film layer | 30 | 38 | 50 | 75 |
| surface functional layer | 3 | 3 | 3 | 3 |
| second protective film | 50 | 50 | 50 | 50 |
| springback | no springback | no springback | no springback | no springback |
| firmness of attachment | firm | firm | firm | firm |

Thermal cycle test is performed on the obtained thermal bending-free photocuring curved screen protective paster to observe the springback condition of the arc edge, wherein the thermal cycle test conditions are as follows: −20-90° C., temperature changing rate being 10° C./min, test time being 72 h; and the influence of springback on the firmness of attachment of the protective paster is tested. The results show that the obtained thermal bending-free photocuring curved screen protective pasters are all firmly attached to the curved screen with ultra-large bending angle, have no springback, and have good performance.

Embodiment 3

In the embodiment, the structure of the thermal bending-free photocuring curved screen protective paster sequentially comprises a first protective film, an OCA glue layer, a main functional layer, a PET resin hardened film layer, a surface functional layer and a second protective film from bottom to top. The layers are overlapped according to the structure to obtain the thermal bending-free photocuring curved screen protective paster, and a target product can be prepared through processes of die cutting, laminating, curing and the like. The first protective film is an acrylic protective film, and the second protective film is a silica gel protective film. The thickness of each film is shown in Table 3.

The main functional layer comprises a thermosetting acrylic resin, isocyanate, polyoxypropylene glycerol ether defoaming agent, 1074 leveling agent from MONENG Chemical co. LTD and polyurethane thickening agent. A mass of the isocyanate accounts for 45% of the mass of the thermosetting acrylic resin; a mass of the defoaming agent accounts for 3% of the mass of the thermosetting acrylic resin; a mass of the leveling agent accounts for 3.5% of the mass of the thermosetting acrylic resin; and a mass of the thickening agent accounts for 1.5% of the mass of the thermosetting acrylic resin. The thermosetting acrylic resin has a hydroxyl value of 150 mgKOH/g. The light transmittance of the main functional layer is ≥92%. The surface functional layer includes a hardened layer composed of an acrylic resin. The peel strength of the first protective film is 1 N/m; the peel strength of the second protective film is 5 N/m.

TABLE 3

| material layers from bottom to top | thickness/ μm | thickness/ μm | thickness/ μm | thickness/ μm |
|---|---|---|---|---|
| first protective film | 50 | 50 | 50 | 50 |
| OCA glue layer | 30 | 10 | 15 | 25 |
| main functional layer | 25 | 60 | 90 | 120 |
| PET resin hardened film layer | 30 | 38 | 50 | 75 |

TABLE 3-continued

| material layers from bottom to top | thickness/ μm | thickness/ μm | thickness/ μm | thickness/ μm |
|---|---|---|---|---|
| surface functional layer | 3 | 3 | 3 | 3 |
| second protective film | 50 | 50 | 50 | 50 |
| springback | no springback | no springback | no springback | no springback |
| firmness of attachment | firm | firm | firm | firm |

Thermal cycle test is performed on the obtained thermal bending-free photocuring curved screen protective paster to observe the springback condition of the arc edge, wherein the thermal cycle test conditions are as follows: −20-90° C., temperature changing rate being 10° C./min, test time being 72 h; and the influence of springback on the firmness of attachment of the protective paster is tested. The results show that the obtained thermal bending-free photocuring curved screen protective pasters are all firmly attached to the curved screen with ultra-large bending angle, have no springback, and have good performance.

It will be appreciated by those skilled in the art that modifications and variations can be made in light of the above teachings without departing from the protection scope of the disclosure as set forth in the appended claims.

The invention claimed is:

1. A thermal bending-free photocuring curved screen protective paster, comprising a first protective film, an OCA glue layer, a main functional layer, a PET film layer, a surface functional layer and a second protective film sequentially arranged from bottom to top;
   wherein the main functional layer comprises a thermosetting acrylic resin, isocyanate, a defoaming agent, a leveling agent and a thickening agent.

2. The thermal bending-free photocuring curved screen protective paster according to claim 1, wherein a mass of the isocyanate accounts for 3-45% of a mass of the thermosetting acrylic resin; a mass of the defoaming agent accounts for 0.01-3% of the mass of the thermosetting acrylic resin; a mass of the leveling agent accounts for 0.05-3.5% of the mass of the thermosetting acrylic resin; and a mass of the thickening agent accounts for 0.4-1.5% of the mass of the thermosetting acrylic resin.

3. The thermal bending-free photocuring curved screen protective paster according to claim 1, wherein the thermosetting acrylic resin has a hydroxyl value of 20-150 mgKOH/g.

4. The thermal bending-free photocuring curved screen protective paster according to claim 1, wherein a light transmittance of the main functional layer is ≥90%.

5. The thermal bending-free photocuring curved screen protective paster according to claim 1, wherein the surface functional layer comprises a hardened layer composed of acrylic resin or a surface functional layer composed of polyurethane resin.

6. The thermal bending-free photocuring curved screen protective paster according to claim 1, wherein a thickness of the main functional layer is 25-250 μm; a thickness of the OCA glue layer is 5-100 μm; a thickness of the surface functional layer is 2-10 μm; a thickness of the PET film layer is 25-150 μm; a thickness of the first protective film is 25-150 μm; and a thickness of the second protective film is 25-150 μm.

7. The thermal bending-free photocuring curved screen protective paster according to claim 1, wherein a peel strength of the first protective film is 0.1-1 N/m; and a peel strength of the second protective film is 0.3-5 N/m.

8. The thermal bending-free photocuring curved screen protective paster according to claim 1, wherein the first protective film is an acrylic protective film and the second protective film is a silica gel protective film.

\* \* \* \* \*